US009969102B2

(12) United States Patent
Vincent et al.

(10) Patent No.: US 9,969,102 B2
(45) Date of Patent: May 15, 2018

(54) COMPOSITION AND METHOD FOR OBTAINING EXPOSED AGGREGATES IN SURFACES OF MOULDED CONCRETE AND OTHER CEMENTITIOUS MATERIALS

(71) Applicant: W. R. Grace & Co.-Conn., Columbia, MD (US)

(72) Inventors: Dany Vincent, Chateaurenaud (FR); Eric Dananche, Courlaoux (FR); Ara Jeknavorian, Chelmsford, MA (US)

(73) Assignee: GCP Applied Technologies Inc., Cambridge, MA (US)

( * ) Notice: Subject to any disclaimer, the term of this patent is extended or adjusted under 35 U.S.C. 154(b) by 522 days.

(21) Appl. No.: 14/361,741

(22) PCT Filed: Nov. 30, 2012

(86) PCT No.: PCT/GB2012/052975
§ 371 (c)(1),
(2) Date: May 30, 2014

(87) PCT Pub. No.: WO2013/079969
PCT Pub. Date: Jun. 6, 2013

(65) Prior Publication Data
US 2014/0374948 A1    Dec. 25, 2014

(30) Foreign Application Priority Data

Dec. 1, 2011    (EP) ..................................... 11191594

(51) Int. Cl.
| *B28B 7/36* | (2006.01) |
| *C04B 28/02* | (2006.01) |
| *C04B 28/06* | (2006.01) |
| *C04B 28/14* | (2006.01) |
| *C04B 28/18* | (2006.01) |
| *C04B 41/00* | (2006.01) |
| *C04B 41/53* | (2006.01) |
| *C04B 41/72* | (2006.01) |
| *B28B 7/38* | (2006.01) |
| *C04B 111/00* | (2006.01) |

(52) U.S. Cl.
CPC ................ *B28B 7/36* (2013.01); *B28B 7/362* (2013.01); *B28B 7/384* (2013.01); *C04B 28/021* (2013.01); *C04B 28/06* (2013.01); *C04B 28/065* (2013.01); *C04B 28/14* (2013.01); *C04B 28/18* (2013.01); *C04B 41/009* (2013.01); *C04B 41/5323* (2013.01); *C04B 41/72* (2013.01); *C04B 2111/00482* (2013.01); *C04B 2111/00939* (2013.01)

(58) Field of Classification Search
CPC .......... B28B 7/36; B28B 7/384; B28B 7/362; C04B 28/06; C04B 28/065; C04B 28/14; C04B 28/18; C04B 41/5323; C04B 41/72; C04B 28/021; C04B 41/009; C04B 2111/00939; C04B 2111/00482
See application file for complete search history.

(56) References Cited

U.S. PATENT DOCUMENTS

| 3,920,465 | A | * | 11/1975 | Burkard | .................. | C04B 28/14 |
| | | | | | | 106/665 |
| 4,205,040 | A | | 5/1980 | Aoyama et al. | | |
| 5,100,697 | A | | 3/1992 | Nielsen et al. | | |
| 5,194,584 | A | | 3/1993 | Leahy et al. | | |
| 5,374,303 | A | | 12/1994 | Hoorn | | |
| 5,709,739 | A | | 12/1998 | Wittich et al. | | |
| 5,900,048 | A | | 5/1999 | Olson et al. | | |
| 6,648,962 | B2 | * | 11/2003 | Berke | ....................... | C04B 7/52 |
| | | | | | | 106/696 |
| 6,811,810 | B2 | | 11/2004 | LaFay et al. | | |
| 7,037,367 | B2 | | 5/2006 | Mauchamp et al. | | |
| 2006/0249054 | A1 | * | 11/2006 | Brothers | ................ | C04B 28/18 |
| | | | | | | 106/792 |
| 2009/0188670 | A1 | | 7/2009 | Xu et al. | | |
| 2009/0297702 | A1 | | 12/2009 | Vincent et al. | | |
| 2011/0135829 | A1 | | 9/2011 | Vincent et al. | | |

FOREIGN PATENT DOCUMENTS

| EP | 0328158 | 6/1993 |
| EP | 0180630 | 10/1998 |
| EP | 1076049 | 2/2001 |
| FR | 2861399 | 4/2005 |
| GB | 1106954 | 3/1968 |
| GB | 1127761 | 9/1968 |
| GB | 1154377 | 6/1969 |
| JP | 2007216667 | 8/2007 |
| KR | 20010005394 | 1/2001 |
| WO | 8505066 | 11/1985 |
| WO | 02098817 | 12/2002 |
| WO | 2004074204 | 9/2004 |

OTHER PUBLICATIONS

Roesky, Form PCT/ISA/210, International Search Report for PCT/GB2012/052975, dated Feb. 19, 2013, 6 pages.
Roesky, Form PCT/ISA/237, Written Opinion of the International Searching Authority for PCT/GB2012/052975, dated Feb. 19, 2013, 7 pages.
Roesky, Partial European Search Report for EP11191594, dated May 23, 2012, 3 pages.
European Search Opinion for EP11191594, dated May 23, 2012, 4 pages.

* cited by examiner

*Primary Examiner* — Matthew J Daniels
*Assistant Examiner* — Leith S Shafi
(74) *Attorney, Agent, or Firm* — Craig K. Leon

(57) ABSTRACT

Surface retarder coating compositions of the invention are based on the use of at least one non-Ordinary Portland Cement (non-OPC) binder and at least one OPC set retarder agent, which are provided in powder form that can be mixed with water at the construction site. The coating is applied onto the surface of a mould or formwork using roller or spray equipment, and concrete can then be cast within 30-60 minutes against the coating. The OPC set-retarding agent operates to retard setting of the concrete so that it can be de-moulded the next day and its surface can be removed using a high pressure water spray to reveal aggregate embedded beneath the removed surface.

6 Claims, No Drawings

COMPOSITION AND METHOD FOR OBTAINING EXPOSED AGGREGATES IN SURFACES OF MOULDED CONCRETE AND OTHER CEMENTITIOUS MATERIALS

CROSS-REFERENCE TO RELATED APPLICATION

This application is a 371 of PCT/GB2012/052975, filed on Nov. 30, 2012, which claims priority to EP application No. 11191594.8, filed on Dec. 1, 2011.

FIELD OF THE INVENTION

The present invention pertains to the manufacture of articles made from hydratable cementitious compositions, such as precast concrete panels, walls, and other articles, and more particularly to a novel concrete surface retarder composition containing cementitious set retarding agents operative for obtaining exposed aggregates surfaces after de-moulding the cement or concrete article from the mould or formwork.

BACKGROUND OF THE INVENTION

It is known to apply concrete surface retarders onto the inner surfaces of moulds or formworks (which are essentially large-scale moulds of assembled wooden boards or shuttering for making walls, foundations, etc.), and exposing the aggregates at the surface of the moulded concrete shape or article. It is customary for commercial "in form" concrete surface retarder products to be provided in the form of solvent-based compositions. These products are typically sprayed or rolled onto the inner surfaces of the concrete mould or formwork.

The cement paste portion of the concrete, which has been in contact with the surface retarder coating, can be removed through the use of pressurized water (spray) to expose aggregates that are embedded in the concrete beneath its removed surface. Most of the commonly used mould-release surface retarders incorporate solvents for their quick drying characteristics. However, solvents generate environmental, health, and safety issues, and hence are subject in many countries to stringent regulation. Manufacturers have attempted to replace solvents with water-based products for these reasons. However, water-based formulations have longer relative drying times compared to solvent-based formulations, Many precast operations take place in open, unheated areas, and these are not favorable conditions for achieving quick trying times when using conventional water-based products, because rate of water evaporation is considerably impeded. This condition is particularly noticeable in the winter time, when temperatures are low and the relative humidity is high on account of the wet concrete environment. Precast concrete panel manufacturers, for example, must plan the application of water-based surface retarder products very early in the day. Concrete panels often must be heated within the formwork to reduce drying time so that at least one concrete panel can be produced from the formwork for each day of operation.

In World Patent Application No. WO 2002/003448 of Grace Construction Products, a method is disclosed for increasing productivity levels without relying on harmful solvents. In this method, a hot melt coating composition containing surface retarder actives is spray-applied onto concrete or onto the surfaces of a concrete mould. However, this approach requires much more robust equipment than is the case for typical spray application of a water- or solvent-based surface retarder-coating composition. It would therefore appear to be an economically feasible opportunity for only the largest precast businesses to pursue.

Accordingly, a novel composition and process are needed for achieving high productivity in cement and concrete moulding operations wherein surface retarders are applied to formworks without the use of solvent-containing products that release volatile organic chemicals (VOCs) into the environment.

SUMMARY OF THE INVENTION

In surmounting the shortcomings of the prior art as described above, the present invention provides a novel composition and process for the manufacture of moulded cement and concrete materials, including precast concrete panels, walls, and other shaped structures and articles, using a surface retarder agent which avoids the use of VOCs while improving productivity of operations wherein cement and concrete panels and other shaped articles are formed in moulds or formworks.

An exemplary surface retarder composition of the invention for coating moulds or formwork such that cement and concrete materials can be cast into shapes such as panels or other articles and can be de-moulded after hardening, comprises: a composition for coating a mould or formwork and de-moulding cement and concrete materials cast therein, comprising: a plurality of dry flowable particles comprising (a) at least one non-Ordinary Portland Cement (non-OPC) binder operative to form a coating when mixed with at least one inert filler and water to form a uniform mixture, said non-OPC binder being present in the amount of 1 to 95 percent, and more preferably 10 to 60 percent; (b) at least one inert filler operative with said at least one non-OPC binder to form a coating when mixed with water and to harden upon the mould or formwork, said at least one inert filler being present in the amount of 0 to 90 percent, and more preferably 5.0 to 80.0 percent; (c) optionally at least one accelerator agent operative to accelerate the setting of said at least one non-OPC binder, said optional at least one non-OPC accelerator agent being present in the amount of 0 to 5.0 percent; and (d) at least one OPC set retarder agent operative to retard the setting of cement or concrete cast into the mould or formwork, said at least one OPC retarder agent being present in the amount of 0.5 to 40.0 percent; all percentages being based on total dry weight of the surface retarder coating composition.

Exemplary methods of the invention thus comprise: mixing with water the above-described coating composition to provide a surface retarder coating for coating the surface of a mould or formwork against which hydratable cement or concrete is cast, coating the surface of the mould or formwork with said surface retarder coating composition, such as through spray or brush application, and allowing the cement or concrete to hydrate and to harden in the mould or formwork. Further methods comprise removing the set cement or concrete from the mould or the formwork, and thereafter removing surface retarder coating composition from the moulded cement or concrete using pressurized water.

The surface retarder coating compositions of the invention can be mixed with water at the construction site, applied onto the surface of a mould using roller or spray equipment, and cement or concrete can be cast into mould within 30-60 minutes. The non-OPC accelerating agents can be used to accelerate the setting of the plaster or other non-OPC binder material in the coating; while an OPC retarding agent works to retard the setting of the concrete in the mould so that it can be de-moulded the next day and its surface can be removed, such as by using a high pressure water spray, to reveal aggregate embedded beneath the removed surface. Further advantages and features of the invention are provided in further detail hereinafter.

DETAILED DESCRIPTION OF EXEMPLARY EMBODIMENTS

As summarized above, the present invention provides compositions and methods for providing a surface retarder coating on moulds or formworks into which cement or concrete compositions are cast. At least one non-Ordinary Portland Cement ("non-OPC") binder such as plaster is used, optionally though preferably with an inert filler material, as a vehicle to carry one or more set retarder agents for retarding the setting of an Ordinary Portland Cement ("OPC") cement, concrete, or other OPC-based hydratable cementitious composition which is cast into the mould or formwork coated with surface retarder coating.

All percentages of components described or claimed herein with respect to surface retarder coating compositions containing the non-OPC binder shall be described in terms of percentage ranges based on total weight of the composition unless otherwise indicated.

The term "mould" refers to forms or shaped devices that function to shape the hydratable OPC cement or concrete into a panels, blocks, paver units, or other construction units; while "formwork" is essentially a large mould, assembled using wood boards and panels for example, designed for forming larger construction structures such as foundations, walls, tunnels, and the like.

The term "cement" as used herein shall mean and refer to pastes, mortars, and concrete compositions which are based on Ordinary Portland Cement ("OPC") as a hydratable binder. Cement is considered to be hydratable, because it is mixed with water to initiate setting of the material into a hardened article such as a wall, panel, or block. OPC-based cements or cementitious materials employed in the present invention may include supplementary cementitious materials such as limestone, hydrated lime, fly ash, granulated blast furnace slag, pozzolans, silica fume, or other materials commonly included to substitute for a portion of the OPC. The terms "paste", "mortar" and "concrete" are terms of art: "pastes" are mixtures composed of the OPC-based binder and water; "mortars" are pastes additionally including fine aggregate (e.g., sand); and "concretes" are mortars additionally including coarse aggregate (e.g., crushed gravel, stone).

Thus, "OPC-based" cements, concretes, and other hydratable OPC-based cementitious compositions in this invention may be formed by mixing required amounts of certain materials, e.g., a hydratable OPC, water, and fine and/or coarse aggregate, as may be applicable to make the particular cementitious building structure or article being formed.

Exemplary surface retarder coating compositions of the invention thus are based on the use of a non-OPC cementitious material, optionally but preferably with an inert filler, to carry one or more OPC set retarding agent(s), and the non-OPC cementitious material is preferably used with a set accelerator which facilitates hardening of the non-OPC coating composition after it is mixed with water and applied to the surface of the mould or formwork. The surface retarder coating composition, after being mixed with water, can be applied using spray equipment, fine or coarse brush, or by hand trowel or screed.

An exemplary surface retarder coating composition of the invention for coating a mould or formwork and de-moulding hydratable cementitious compositions (such as mortar or concrete) cast therein, comprises a plurality of dry flowable particles which include but are not limited to the following: (a) at least one non-Ordinary Portland Cement (non-OPC) binder operative to form a coating when mixed with at least one inert filler and water to form a uniform mixture, the non-OPC binder being present in the amount of 1 to 95 percent, and more preferably 10 to 60 percent; (b) at least one inert filler operative with said at least one non-OPC binder to form a coating when mixed with water and to harden upon the mould or formwork, the at least one non-OPC binder being present in the amount of 0 to 90 percent, and more preferably 5-80 percent; (c) optionally, though preferably, at least one accelerator agent operative to accelerate the setting of said at least one non-OPC binder, the at least one non-OPC accelerator agent being present in the amount of 0 to 5.0 percent; and (d) at least one OPC set retarder agent operative to retard the setting of cement or concrete cast into the mould or formwork, the at least one OPC retarder agent being present in the amount of 0.5 to 40.0 percent. All percentages set forth herein are based on total dry weight of the surface retarder coating composition.

Non-OPC binders which are contemplated for use in the present invention include calcium sulfate (e.g., plaster), alumina cement, sulfoalumina cement, aluminosilicate, combinations of lime with a non-crystalline siliceous material in powder form, and mixtures thereof. A preferred non-OPC binder material is plaster. The plaster could be alpha or beta grade. For example, alpha grade plaster is typically used as moulding plaster and beta as building plaster (See e.g., EN 132 79-1). Where plaster is used as the non-OPC binder, the plaster may be present in the coating composition in the amount of 1-95%, more preferably 10-60%, and most preferably 10-40%, based on total dry weight of the coating composition.

Exemplary aluminosilicate materials which may also be used as the non-OPC binder material, which may be used in combination with plaster (or not), include fly ash, bottom ash, volcanic glass, natural pozzolan, metakaolin, ground granulated blast furnace slag, red mud, raw and calcined clays and shale, diatomaceous earth, zeolite, and mixtures thereof.

Other exemplary materials contemplated for use as the non-OPC binder for purposes of the present invention include a powder mixture of lime with non-crystalline siliceous by-products from silicon metal production or ferrosilicon allows, silica flour, rice hull ash, silica flour, or combinations thereof.

Exemplary inert fillers which are used in combination with the non-OPC binder include calcium carbonate, silica, barium sulfate, talc, mica, or mixture thereof. The use of calcium carbonate is preferred. The amount of inert filler is 0.0 to 90.0 percent, and more preferably 5.0-80.0 percent, based on total dry weight of the coating composition.

Optionally but preferably the surface retarder coating composition of the invention includes at least one set accelerating agent for accelerating the setting or hardening of the non-OPC binder material (e.g., plaster). Preferred non-OPC set accelerators may be selected from anhydrites, gypsum, potassium sulfate, sodium sulfate, zinc sulfate, iron sulfate, calcium chloride, sodium chloride, magnesium chloride, ammonium chloride, fluorinated salt, nitrite, nitrate, formate, acetate, chloride, thiocyanate, or mixtures thereof. When plaster is used as the non-OPC binder, the use of gypsum is preferred. Sodium benzoate, calcium nitrite, calcium nitrate, and mixtures thereof are known to have anti-corrosion resistance, and may be preferred where the molds or formwork are made of metal. Non-OPC set accelerating agent or agents may be used in the coating composition in the amount of 0.0 to 5.0 percent, based on total dry weight of the coating composition.

The present invention contemplates the use of at least one OPC set retarding agent. Suitable OPC set retarding agents therefore include saccharose, mannose, fructose, lactose, glucose, maltose, xylose, dextrose, arabinose, molasses, sucrose, a borate, a phosphate, a phosphonate, a zinc salt, a hydroxycarboxylate, an organic acid or salt thereof, an ester of an organic acid or salt thereof, or mixtures thereof. Preferred among organic salts used as OPC set retarding agents herein are citrate, tartarate, gluconate, malate, glutamate, and mixtures thereof. Preferred among esters of organic salts used as OPC set retarding agents are diethyltartarate and triethylcitrate. Other esters of organic salts which are believed to be suitable for this use may also be found in World Patent Application No. 2010/020857 A1, owned by common assignee hereof. Said at least one OPC set retarding agent is preferably used in exemplary surface retarder coating compositions of the invention in the amount of 0.5 to 40.0 percent based on total dry weight of the composition.

In further exemplary surface retarder coating compositions of the invention, certain retarding agents should be avoided which might adversely affect the ability of non-OPC binding material to set. For example, if the non-OPC binding material is plaster, the following retarder agents should be avoided—citric acid, succinic acid, malic acid, gluconic acid, tartaric acid. Thus, preferred coating compositions comprise plaster as the non-OPC binding material, but are devoid of the aforementioned retarders.

Exemplary surface retarder coating compositions of the invention include one or more additional additives, such as thickeners, resins, colorants, dispersants, defoaming agents, and (where metal moulds or formwork is used) corrosion inhibitors.

Suitable thickeners which could help to achieve a desired rheology for improved application include polysaccharide biopolymers such as diutan gum, welan gum, and xanthan gum, as well as cellulosic derivatives, guar gum, and starch. Other water soluble or dispersable resins could be used such as polyvinylpyrrolidones, polyvinylalcohols, or (dried) emulsion resins. Cellulosic derivatives are also preferred. The thickeners could be used in the surface retarder coating compositions in the amount of 0.0 to 10.0 percent, more preferably 0.5 to 3.0 percent, based on total dry weight of the coating composition.

Exemplary resins, which could be used for improving abrasion resistance of the surface retarder coating compositions, when applied in the mould or formwork, include acrylic resins, vinyl resins, styrene butadiene resins, and the like. The preferred amount of resin is 0.0 to 20.0 percent, and more preferably 0.0 to 10.0 percent, based on total dry weight of the surface retarder coating composition.

Exemplary colorants include known pigments and dye materials as conventionally used in paints and plaster formulations for improving light blocking and/or for providing visual distinction in the final product. These include but are not limited to titanium dioxide, iron oxide, chromium oxide, and the like. The colorants can be used in the surface retarder coating composition in the amount of 0.0 to 15.0 percent, and more preferably 0.0 to 10.0 percent, based on total dry weight of the surface retarder coating composition.

As previously mentioned, corrosion inhibitor agents may be incorporated where the surface retarder composition is to be coated onto steel. Agents that are typically incorporated into paints for metal surfaces are believed to be suitable for this purpose, so long as they do not retard the setting of the non-OPC binder material or otherwise interfere with the ability of the OPC retarding agent to retard the setting of cement or concrete that is cast against the mould or formwork.

Still further exemplary surface retarder coating compositions of the invention incorporate one or more additional additives for improving processing properties, such as in the moulding or de-moulded of shaped cement articles, or for improving physical properties of the coating composition. For example, one or more surfactants may be incorporated to reduce surface tension and to facilitate application of the surface retarder coating composition onto greasy mould surfaces. Such surfactants may comprise silicone or other materials.

As another example, one or more water-repellent materials may be incorporated to reduce drying time of the surface retarder coating composition when applied as a thin layer onto the mould or formwork (to the extent that it does not substantially dry out the composition when it is contained in a bucket or bulk container). Exemplary water-repellent materials include fatty acid type materials such as an oleate (e.g., butyl oleate), a stearate (e.g., butyl stearate), or mixture thereof.

The surface retarder coating compositions of the invention may be shipped in dry powder form to the construction site or precast plant, and mixed with water in sufficient amounts to initiate hydration of the non-OPC binder material (e.g., plaster); and the coating composition thereafter may be applied, such as by spray application, onto the moulds or formwork. It is expected that the coating will set within 30 minutes, and yet the OPC retarding agent actives will still be operative to retard the setting of cement or concrete that is cast into the mould or formwork. Hence, exemplary methods of the present invention for manufacturing a cement or concrete article, such as a precast concrete article (e.g., panel, block, paver) comprises mixing with water the dry powder composition which contains the non-OPC binder, inert filler(s), and OPC set retarder, and other optional ingredients; coating the surface of the mould or formwork with the surface retarder coating composition, such as through spray application; and allowing the cement or concrete to hydrate. Further steps involve removing the mould or formwork from the cement or concrete, and thereafter removing the surface retarder coating composition from the moulded cement or concrete using pressurized water, such as water squirted through a nozzle.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples.

EXAMPLE 1

The following exemplary formulation will provide a surface retarder coating composition with excellent drying time, adhesion resistance, and other excellent performance traits when used for obtaining exposed aggregate concrete surfaces: Plaster (26%); Gypsum (0.15%); Cellulosic Thickener (1.3%); Dextrose (2%); and Calcium Carbonate (average particle size of 15 microns) (70.55%). These components were blended to provide a non-harmful powder product. This blend was then mixed with water with a ratio of 100 g. of powder to 150 g. water, and applied using roller onto mould surface, at a rate of 100-150 g/m². Curing time takes about 30 minutes (assuming temperature between +5 to +40 degrees C.), and the coated mould is ready for receiving the cast concrete, which is allowed to cure over night. The next day, the concrete is removed from the mould, and aggregates embedded in the concrete are revealed using a high pressure water jet to remove the surface of the concrete that was in contact with the surface retarder coating (having OPC set retarder active contained therein). The obtained etch is approximately 3-6 mm in depth (and the depth will depend upon the design of the concrete mix).

EXAMPLE 2

The following example is similar to the coating composition in Example 1 above, but was designed to achieve a slightly decreased etching depth (2-4 mm). The following components were mixed together to provide the surface retarder coating composition (in the form of a powder product): Plaster (26%); Gypsum (0.15%); Cellulosic Thickener (1.3%); Lactose (2%); and Calcium Carbonate (average particle size of 15 microns) (70.55%).

EXAMPLE 3

The following example is similar to the coating composition in Example 1 above, but was designed to achieve a slightly decreased etching depth (6-10 mm). The following components were mixed together to provide the surface retarder coating composition (in the form of a powder product): Alumina cement (Kerneos Ternal White) (26%); Cellulosic Thickener (0.5%); Saccharose (5%); and Calcium Carbonate (average particle size of 15 microns) (68.5%).

The present invention is not to be limited by the foregoing examples and illustrations, which are provided for illustrative purposes only.

The invention claimed is:

1. A method for manufacturing a concrete article using a mold or formwork, comprising:
   mixing with water a coating composition to provide a surface retarder coating composition for coating the surface of a mold or formwork against which hydratable concrete is cast;
   coating the surface of the mold or formwork with the surface retarder coating composition;
   casting concrete containing aggregate against the coated surface of the mold or formwork;
   allowing the concrete to hydrate and to harden against the coated surface in the coated mold or formwork;
   the surface-retarder coating composition comprising:
   (a) at least one non-Ordinary Portland Cement (non-OPC) binder operative to form a coating when mixed with at least one inert filler and water to form a uniform mixture, the non-OPC binder comprising plaster and being present in the amount of 10 to 95 percent based on total dry weight of the coating composition;
   (b) at least one inert filler operative with the at least one non-OPC binder to form a coating when mixed with water and to harden upon the mold or formwork, the at least one inert filler being present in the amount of 5.0 to 80.0 percent based on total dry weight of the coating composition, the inert filler chosen from calcium carbonate, silica, barium sulfate, talc, mica, or mixture thereof;
   (c) at least one accelerator agent operative to accelerate the setting of the at least one non-OPC binder, the accelerator agent comprising gypsum and being present in an amount up to 5.0 percent based on total dry weight of the coating composition; and
   (d) at least one OPC set retarder agent operative to retard the setting of concrete cast into the mold or formwork, the at least one OPC retarder agent being present in the amount of 0.5 to 40.0 percent based on total dry weight of the coating composition, the at least one OPC set retarder agent being chosen from esters of carboxylic acids, dextrose, glucose, sucrose, and lactose, or mixtures thereof;
   removing the mold or formwork from the concrete after setting; and
   removing the coating composition from the surface of the concrete to expose aggregate in the concrete.

2. The method of claim 1 wherein component (a) further comprises fly ash, bottom ash, volcanic glass, natural pozzolan, metakaolin, ground granulated blast furnace slag, red mud, raw and calcined clays and shale, diatomaceous earth, zeolite, or mixtures thereof.

3. The method of claim 1 wherein component (a) further comprises lime with non-crystalline siliceous by-products chosen from silicon metal production ferrosilicon alloys, silica flour, rice hull ash, or combination thereof.

4. The method of claim 1 wherein component (b) is calcium carbonate.

5. The method of claim 1 further comprising (a) at least one additive chosen from thickeners, resins, colorants, dispersants, defoaming agents, and corrosion inhibitors; (b) water; or (c) a mixture of components (a) and (b).

6. The method of claim 1 wherein the coating composition further comprises an anti-corrosion agent for resisting corrosion of molds or formwork made of metal.

* * * * *